United States Patent Office 3,384,752
Patented May 21, 1968

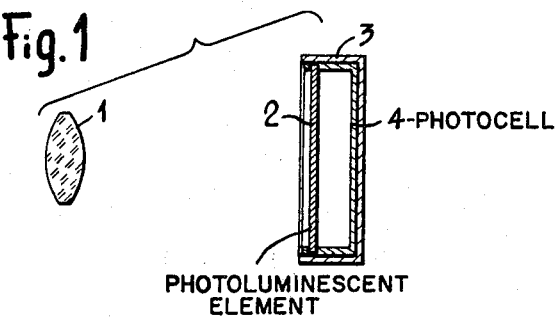
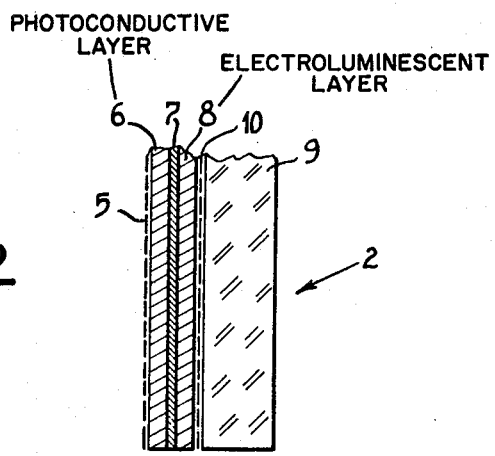

3,384,752
ARRANGEMENT FOR DETECTING THE MAXIMUM SHARPNESS OF AN IMAGE
Giovanni Odone, Yverdon, Switzerland, assignor to Paillard S.A., Saint-Croix, Vaud, Switzerland, a corporation of Switzerland
Filed Apr. 10, 1964, Ser. No. 358,896
Claims priority, application Switzerland, Apr. 17, 1963, 4,795/63
3 Claims. (Cl. 250—213)

ABSTRACT OF THE DISCLOSURE

An arrangement for detecting the maximum sharpness of an image including a photoluminescent element having a non-linear curve of response and means for measuring the average luminous intensity of such element.

For various technical purposes, chiefly for photographic, kinematographic and television purposes, it is sometimes desirable to resort to apparatus for automatically ascertaining the sharpness of an image and for adjusting the focusing of an objective.

My invention has for its object such an arrangement for detecting the maximum sharpness of an image, chiefly of the image formed by an objective. According to my invention, I provide a photoluminescent element having a non-linear curve of response and means for measuring the average luminous intensity of said element.

I have illustrated, by way of a mere exemplification in the accompanying and diagrammatic drawings, a preferred embodiment of my invention. In said drawings:

FIGURE 1 is a diagrammatic illustration of said embodiment, while

FIGURE 2 is on a larger scale a detailed cross-section of a photoluminescent element incorporated with the arrangement according to FIGURE 1.

Referring to FIGURE 1, an image is formed by an objective illustrated diagrammatically by a lens 1, the plane of said image registering, when the focusing is accurately executed, with the front surface of a photoluminescent element 2, which surface is light-sensitive whereas the rear surface of said element, enclosed inside the casing 3, forms a source of light the intensity of which is a function of the amount of light received by the front surface of the element. Said element 2 has a non-linear curve of response; in other words, the intensity of the light produced by the rear surface of the element 2 is not in linear proportional relationship with the intensity of the light impinging on the front surface of said element.

Means are provided for measuring the average luminous intensity produced by the element 2, said means being constituted by a photocell 4 carried by the bottom of the casing 3. The photo-luminescent element 2 is adapted to amplify the brilliancy of an image in accordance with well-defined methods.

FIGURE 2 is a diagrammatic cross-section on a much larger scale passing through said element 2. The latter includes primarily a first electrode constituted by a transparent conductive layer 5 which is laid on a photo-conductive layer 6. The latter extends directly over a conductive but opaque layer 7 which is in its turn in contact with a layer 8 of an electroluminescent material constituted for instance by zinc sulfide. Said last layer 8 is carried by a glass plate 9 forming a mechanical support for the whole arrangement. A second electrode also constituted by a transparent and conductive material 10 is fitted between the layer 8 and the glass plate 9.

When a point of the photo-conductive layer 6 is not illuminated, the electric resistance provided by the corresponding fraction of the layer is sufficiently high so that in practice the voltage across the electrodes 5 and 10 is applied completely or almost completely across said layer 6 and the voltage between the surface of the layer 8 in the area immediately adjacent the area considered in the layer 6, is too low for it to produce an emission of photons.

When in contradistinction, a fraction of the layer 6 is illuminated, its resistance decreases and the electric field prevailing in the adjacent fraction of the layer 8 is now sufficient for the discharge of photons out of the area considered. The rear surface of the element 2 thus reproduces the picture projected onto its front surface and in principle this is performed with a higher luminous intensity.

It is a well-known fact that the brilliancy of the layer 8 increases in accordance with an exponential law with reference to the electrical field applied, whereas said field is a substantially linear function of the illumination of the photo-conductive layer 6. Consequently, the light produced is an exponential function of the illumination. This results in that, for a same average luminous intensity impinging on the front surface of the element 2, the maximum average luminous intensity on the rear surface is obtained when the contrasts are more marked, that is for a maximum sharpness of the picture received by the front surface of the element 2. The illumination produced is measured by means of the photocell 4 which feeds a current adapted to serve as a pilot current for the means adjusting the focusing. The accurate focusing is obtained when, for a predetermined image, the photocell 4 feeds a maximum current.

It is also possible to contemplate the use of photoluminescent elements, the curve of response of which does not increase exponentially but shows in contradistinction a bent section similar to that obtained through a saturation effect. In such a case, the conditions would be reversed and maximum sharpness of the image formed on the photoluminescent element would correspond with a minimum average luminous intensity produced by the rear surface of said element.

The arrangement illustrated may also serve for television purposes, in which case the photoluminescent element would be set in direct contacting relationship with the screen of a receiver tube.

Obviously, it is not essential for the photoluminescent element to receive the entirely of the image formed by an objective or projected on the screen of a television tube and it may be movable so that it may be positioned in front of only that portion of the image of which it is desired to ascertain the sharpness.

I claim:

1. An arrangement for ascertaining the maximum sharpness of an image, chiefly the image of an objective, comprising a photo-luminescent element adapted to receive said image and to produce a replica thereof in accordance with non-linear curve of response of the light produced versus the light received at the different points of the image and a photosensitive element to measure the average intensity of the light produced by said photoluminescent element.

2. An arrangement for ascertaining the maximum sharpness of an image, chiefly the image of an objective, comprising a photo-luminescent element constituted by a succession of electrically interconnected parts including a first transparent electrode, a photo-conductive layer adapted to receive the image, an electro-luminescent layer adapted to produce a replica of the image in accordance with a non-linear curve of response and a second transparent electrode and a photosensitive element to measure the average intensity of the light produced by the electroluminescent layer of said photoluminescent element.

3. An arrangement for ascertaining the maximum sharpness of an image, chiefly the image of an objective, comprising a photoluminescent element constituted by a succession of electrically interconnected parts including a first transparent electrode, a photo-conductive layer adapted to receive the image, an opaque conductive layer, an electroluminescent layer adapted to produce a replica of the image in accordance with a non-linear curve of response and a second transparent electrode and a photosensitive element to measure the average intensity of the light produced by the electroluminescent layer of said photoluminescent element.

References Cited

UNITED STATES PATENTS

| 2,935,558 | 5/1960 | Van Winkle | 88—56 |
| 2,948,816 | 8/1960 | Van Santen et al. | 250—213 |
| 3,041,459 | 6/1962 | Greene | 88—1 |
| 3,193,687 | 7/1965 | Hatcher | 250—216 |

OTHER REFERENCES

Craig: "Potential Applications for Focatron Idea," November 1961, 10 pp.

RALPH G. NILSON, *Primary Examiner.*

WILLIAM F. LINDQUIST, *Examiner.*

J. D. WALL, T. N. GRIGSBY, *Assistant Examiners.*